United States Patent
Hähle et al.

(10) Patent No.: US 8,179,063 B2
(45) Date of Patent: May 15, 2012

(54) TRACTION DRIVE OF A RAIL VEHICLE FOR DRIVING AND GENERATIVE BRAKING

(75) Inventors: Falk Hähle, Germering (DE); Ulf Friesen, Neubiberg (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 399 days.

(21) Appl. No.: 12/447,708

(22) PCT Filed: Oct. 25, 2007

(86) PCT No.: PCT/EP2007/009258
§ 371 (c)(1), (2), (4) Date: Apr. 29, 2009

(87) PCT Pub. No.: WO2008/052693
PCT Pub. Date: May 8, 2008

(65) Prior Publication Data
US 2010/0066281 A1 Mar. 18, 2010

(30) Foreign Application Priority Data
Oct. 31, 2006 (DE) .......... 10 2006 051 337

(51) Int. Cl.
*H02P 3/14* (2006.01)
(52) U.S. Cl. .......... 318/376
(58) Field of Classification Search .......... 318/376–381
See application file for complete search history.

(56) References Cited

U.S. PATENT DOCUMENTS
2004/0222761 A1 * 11/2004 Jockel .......... 318/376

FOREIGN PATENT DOCUMENTS

| | | |
|---|---|---|
| DE | 678 896 | 7/1939 |
| DE | 101 60 612 A1 | 6/2003 |
| DE | 10 2004 032680 A1 | 2/2006 |
| DE | 10 2006 051 317 A1 * | 5/2008 |
| DE | 10 2006 051 319 A1 * | 5/2008 |
| EP | 1 520 829 A | 4/2005 |
| WO | WO 2005/048446 | 5/2005 |

OTHER PUBLICATIONS

International Search Report for International Application No. PCT/EP2007/009258.

* cited by examiner

*Primary Examiner* — Thomas Dougherty
(74) *Attorney, Agent, or Firm* — Barnes & Thornburg LLP

(57) ABSTRACT

The invention relates to a traction drive for the driving and generative braking of a rail vehicle or a combination of rail vehicles, a permanent-field synchronous motor and a traction current converter being respectively associated with at least two axles of the rail vehicle or combination of rail vehicles. The traction current converter includes at least one pulse current converter on the engine side, and the clamps of the permanent-field synchronous motor are connected to a change-over switch such that the permanent-field synchronous motor can be connected to a load circuit containing at least one load element, in order to drive the pulse current converter or for generative braking. According to the invention, the load circuits connected to the permanent-field synchronous motors for generative braking are designed such that the brake characteristic lines of the permanent-field synchronous motors differ in terms of characteristic features such as the position of the maximum of the brake torque according to the rotational speed.

7 Claims, 3 Drawing Sheets

TRACTION DRIVE OF A RAIL VEHICLE FOR DRIVING AND GENERATIVE BRAKING

CROSS-REFERENCE TO RELATED APPLICATIONS

The present application claims the benefit of priority to International Application No. PCT/EP2007/009258 filed 25 Oct. 2007, which claims priority to German Patent Application No. 10 2006 051 337.1 filed 31 Oct. 2006, the contents of which are incorporated herein by reference in their entirety.

BACKGROUND

The invention is based on a traction drive for driving, and for performing regenerative braking of a rail vehicle or a combination of rail vehicles, wherein at least two axles of the rail vehicle or of the combination of rail vehicles are respectively assigned a permanently excited synchronous motor and a traction current converter, and the traction current converter has at least one machine-side pulse current converter, and the permanently excited synchronous motor is connected at its terminals to a changeover switch in such a way that the permanently excited synchronous motor can be connected to a load circuit containing at least one load element in order to drive the pulse current converter or to perform regenerative braking.

The objective when equipping rail vehicles is to use ever more effective and lightweight drive machines. Presently, inverter-fed asynchronous machines are used as the standard drive machine. However, these machines offer little potential for further development in terms of reducing their mass and torque density and, when used in rail vehicles, these machines usually require a transmission. For this reason, increasing efforts are currently being made to develop and use permanently excited synchronous machines as vehicle drives. By virtue of its high torque density, this type of machine permits direct drives to be implemented while eliminating the transmission means; this allows the mass of the drive train to be reduced to a very high degree.

Permanently excited synchronous machines have a number of particular features compared to asynchronous technology owing to their permanent excitation. Therefore, in the case of a rotating machine, for example, it is possible to achieve a braking effect in addition to the inverter-regulated generator mode using purely passive components. The braking effect which is achieved by a permanently excited synchronous machine by connecting braking resistors is disclosed in DE 101 60 612, which defines the generic type.

When the rotating, permanently excited synchronous machine with braking resistors is connected into the circuit, a characteristic torque curve or characteristic force curve, also referred to below as a natural braking characteristic curve, is obtained as a function of the rotational speed of the synchronous motor and, therefore, also of the speed of the vehicle. The braking characteristic curve has a maximum value in its profile when plotted against the rotational speed/speed.

The problem when using the regenerative braking effect of a permanently excited synchronous motor is, therefore, that the natural braking characteristic curve does not have a constant braking torque profile when plotted against the rotational speed. This constitutes a disadvantage in the braking behavior compared to the technology with a regulated braking force which is conventionally customary.

SUMMARY

The invention is based on the object of developing a traction drive of the above-mentioned type in such a way that the braking behavior can be influenced selectively.

The basic idea of the invention is that the load circuits that are connected to the permanently excited synchronous motors in order to perform regenerative braking are embodied in such a way that the brake characteristic curves of the permanently excited synchronous motors are different in terms of characteristic features such as the position of the maximum braking torque as a function of the rotational speed.

In other words, despite the design of the motors being identical the braking characteristic curves of the permanently excited synchronous motors have braking torques of different magnitude when the rotational speed is the same owing to the different load circuits. If, for example, the load circuit of one of the synchronous motors gives rise to a maximum braking torque at low rotational speeds, this can compensate a braking torque which is relatively low in comparison at low rotational speeds and is generated by another synchronous motor of the rail vehicle owing to a different load circuit. In an analogous fashion, the other synchronous motor with a maximum braking torque at relatively high rotational speeds can compensate the braking torque of the synchronous motor which is then lower.

Two or more permanently excited synchronous motors that are identical but are provided with different load circuits can then be combined with one another synchronous motor in such a way that, by superimposing the braking characteristic curves (which are then different), a braking torque profile (which is as balanced or constant as possible when plotted against the rotational speed) is obtained for a bogie, a rail vehicle component, an individual vehicle (such as a wagon) or a combination of rail vehicles. This is achieved by adjusting the passive load circuits of the individual permanently excited synchronous drives.

The more load circuits of the individual drives are matched to one another, the better the degree by which the braking torque profile can be approximated to a constant braking torque. In the simplest case, as described in the following exemplary embodiment, this can be done by using different resistance values of the braking resistors. However, any desired connection of resistors, capacitors and/or inductors such as choking coils is also conceivable.

Advantageous developments and improvements of the invention specified in the independent claims are possible by virtue of the measures specified in the dependent claims.

At least two axles, each with at least one permanently excited synchronous motor, a machine-side traction current converter, a changeover switch and a load circuit may be assigned to a bogie of the rail vehicle or of the combination of rail vehicles. An approximately constant braking torque profile can then be obtained for each bogie.

Generally, the load circuits of the permanently excited synchronous motors assigned to the at least two axles can differ in load elements and/or in having different connections of their load elements. A particularly simple embodiment is obtained if the load circuits of the at least two axles merely have different braking resistors, wherein the braking resistors of the load circuits are embodied, for example, in such a way that the maximum braking torque of the braking characteristic curve of the permanently excited synchronous motor assigned to the one axle occurs at a lower rotational speed than the maximum braking torque of the braking characteristic curve of the permanently excited synchronous motor assigned to the other axle.

BRIEF DESCRIPTION OF THE FIGURES

An exemplary embodiment of the invention is illustrated in the figures and will be described in more detail in the following description. In the figures.

DETAILED DESCRIPTION

Figure 1:
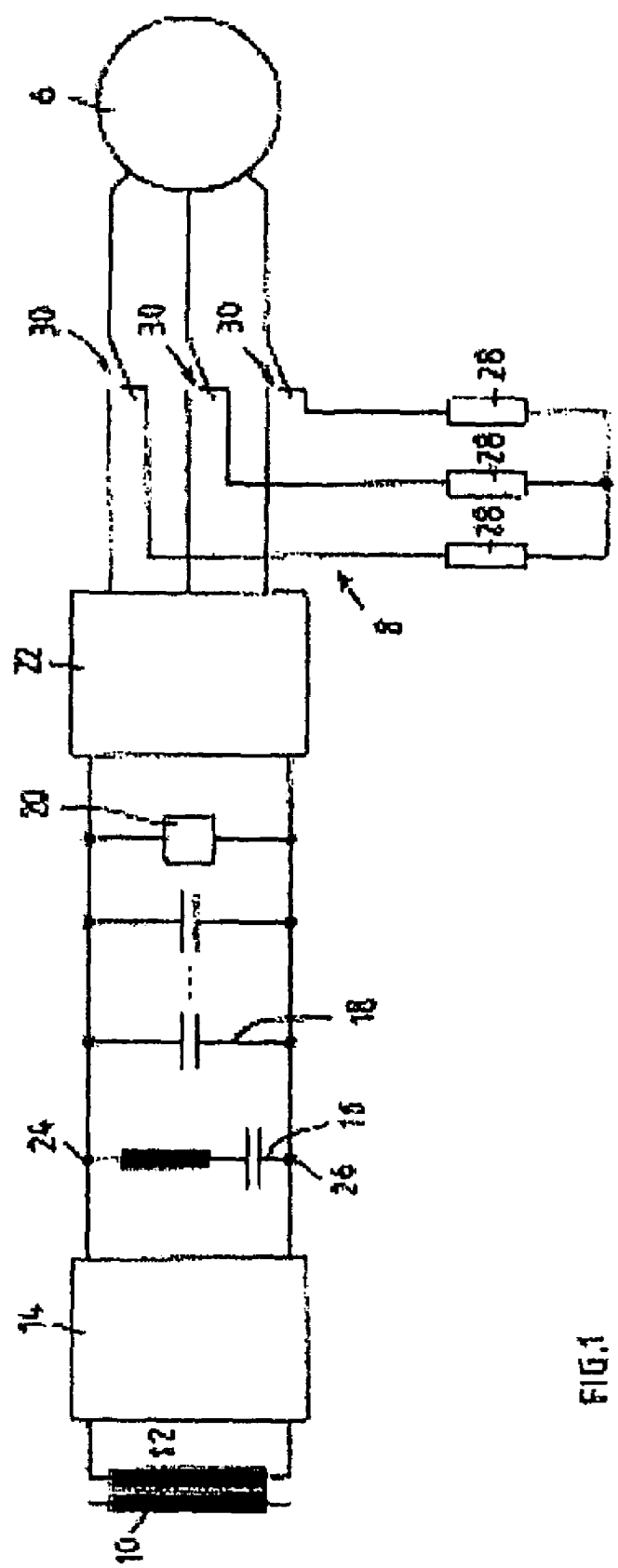
FIG. 1 is a schematic illustration of a traction drive for an alternating current vehicle according to an embodiment of the invention.

In FIG. 1, a traction drive 1 for an alternating current vehicle, also referred to as an AC rail vehicle, is illustrated wherein, a traction transformer is denoted by 2, a traction current converter by 4, a permanently excited synchronous motor by 6 and a brake device by 8. The traction transformer 2 has a primary winding 10 and a plurality of secondary windings 12 (only two secondary windings 12 of which being illustrated). The traction current converter 4 has two four-quadrant choppers 14, an absorption circuit 16, a capacitor battery 18, an overvoltage protection device 20 and a machine-side pulse current converter 22. The two four-quadrant choppers 14 are each linked on the alternating voltage side to a secondary winding 12 of the traction transformer 2 and are connected electrically in parallel on the direct voltage side. The absorption circuit 16, the capacitor battery 18, the overvoltage protection device 20 and the direct-voltage-side input connections of the machine-side pulse current converter 22 are connected electrically parallel to the two direct-voltage-side connections 24 and 26 of this feed circuit. On the output side, the machine-side pulse current converter 22 can be connected to connections of the permanently excited synchronous motor 6.

The brake device 8 is composed, per phase, of the permanently excited synchronous motor 6, a braking resistor 28 and a changeover switch 30. These braking resistors 28 are connected electrically in, for example, a star configuration and each have, for example, a constant resistance value. A triangular circuit is alternatively also conceivable. The changeover switches 30 are linked in such a way to the outputs of the machine-side pulse current converter 22 and to the inputs of the permanently excited synchronous motor 6 such that the inputs of the permanently excited synchronous motor 6 can be connected on one side to the braking resistor 28 and on the other side to the outputs of the machine-side pulse current converter 22.

These changeover switches 30, which are also referred to as failsafe switches, can be activated electrically, mechanically or pneumatically. As soon as these changeover switches 30 have moved from the "drive" operating position, i.e., the terminals of the permanently excited synchronous motor 6 are connected to the outputs of the machine-side pulse current converter 22, into the "brake" operating position, i.e., the terminals of the permanently excited synchronous motor 6 are connected to the braking resistors 28 which are connected in a star; the permanently excited synchronous motor 6 also generates a braking torque, which changes in accordance with the profile of the braking characteristic curve as the speed of the rail vehicle is reduced. Neither the machine-side pulse current converter 22 nor any kind of regulating means is required to generate the braking torque.

Such a traction drive 1 is described in detail in DE 101 60 612, mentioned above. For this reason, no further reference will be made to the structure of functionality of the traction drive.

At least two axles of the AC rail vehicle are assigned such a permanently excited synchronous motor 6 with traction current converter 4 and the further components according to FIG. 1. In this context, the braking resistors 28 form a load circuit 32, which is assigned to the synchronous motor 6 and to which it is connected by means of the changeover switch 30 to perform regenerative braking. In the regenerative braking mode, such a synchronous motor 6 has a braking characteristic curve 36 such as the one illustrated, for example, in FIG. 3 by means of the dashed line.

A braking characteristic curve, as explained herein, is understood to be the profile of the braking torque M or of the braking force F plotted against the rotational speed n of the synchronous motor 6, which is identical to the axle rotational speed in the present case of direct drive. This axle rotational speed n is proportional to the velocity of the AC rail vehicle. As is apparent from FIG. 3, the braking torque M firstly increases steeply as the rotational speed n rises from zero, before said braking torque M drops again after a maximum value $M_{max}$ has been reached. A rotational speed $n_{Mmax}$ is assigned to this maximum braking torque $M_{max}$. The rotational speed $n_{Mmax}$ represents a typical profile of a braking characteristic curve of a permanently excited synchronous motor 6, to which a load circuit 32 with braking resistors 28 is connected in the regenerative braking mode.

The load circuits 32 of the synchronous motors 6, which are assigned to the various axles, are embodied in such a way that their braking characteristic curves are different with respect to the rotational speed $n_{Mmax}$ at which the maximum braking torque $M_{max}$ respectively occurs. Two or more permanently excited synchronous motors 6, which are identical but are provided with different load circuits 32, may be combined with one another in such a way that, by superimposing the braking characteristic curves that are then different, a braking torque profile which is as balanced as possible when plotted against the rotational speed n is obtained for a bogie, a rail vehicle component, an individual vehicle (such as a wagon) or a combination of rail vehicles. This is done by adjusting the passive load circuits 32 of the individual permanently excited synchronous motors 6. This adjustment is carried out here by correspondingly selecting and connecting passive load elements such as, for example, resistors, choking coils and/or capacitors.

Using braking resistors 28 whose value can be continuously adjusted or switched simplifies adjustment of the load circuits 32. Within the scope of the invention, the respective resistance value of the load circuit 32 of a permanently excited synchronous motor 6 is adjusted with respect to the load circuits 32 of the other permanently excited synchronous motors 6 before the regenerative brake operates so that it can no longer be changed during the braking mode.

Figure 2:
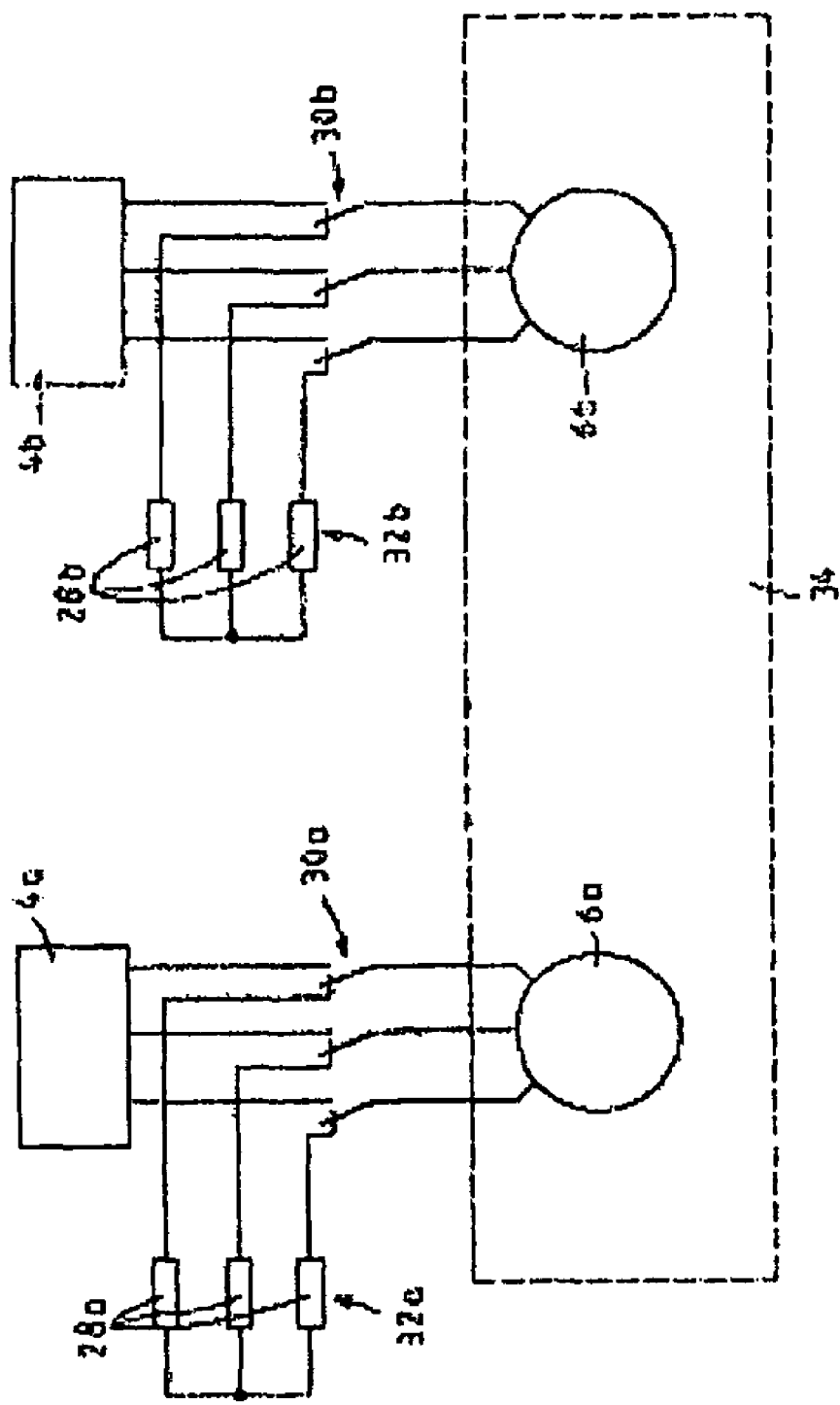
FIG. 2 is a schematic illustration of a bogie having two axles, each of which being equipped with a traction drive in the manner of FIG. 1.

According to one exemplary embodiment according to FIG. 2, a bogie 34 of the AC rail vehicle has two axles, each with at least one permanently excited synchronous motor 6a, 6b, one machine-side traction current converter 4a, 4b, one changeover switch 30a, 30b and one load circuit 32a, 32b. Each of the two drive shafts of the two axles of the bogie 34 are driven by a permanently excited synchronous motor 6a, 6b, which synchronous motors 6a, 6b are preferably identical, as are also the traction current converters 4a, 4b. However, the respective load circuits 32a, 32b may differ. Resistors 28a with resistance values which are higher than the resistance values of the resistors 28b of the load circuit 32b of the other permanently excited synchronous motor 6b are may be installed in the load circuit 32a of the one permanently excited synchronous motor 6a.

The influence of different resistors on the position of the maximum braking torque $M_{max}$ or the maximum braking force when plotted against the rotational speed n within the braking characteristic curve is as follows. As the braking resistance values decrease, the maximum braking torque $M_{max}$ is displaced in the direction of relatively low rotational speeds n or speeds until the short circuit occurs, i.e., only the internal resistance of the drive continues to act. Conversely, as the braking resistance values increase the maximum braking torque $M_{max}$ is displaced in the direction of relatively high rotational speeds n or speeds. However, the absolute value of the maximum braking torque $M_{max}$ of the braking characteristic curve remains the same provided that the inductors and capacitors in the brake circuit do not change.

The one permanently excited synchronous motor 6a then has the maximum braking torque $M_{max}$ of its braking characteristic curve 36 (dashed line) at a lower rotational speed $n_{Mmax\ a}$ than the other permanently excited synchronous motor 6b whose maximum braking torque $M_{max}$ of its braking characteristic curve 38 (dotted line) is at a higher rotational speed $n_{Mmax\ b}$. The maximum braking torque $M_{max}$ is in each case of equal size since a variation in the resistance values displaces the maximum braking torque $M_{max}$ but does not change its magnitude.

Figure 3:
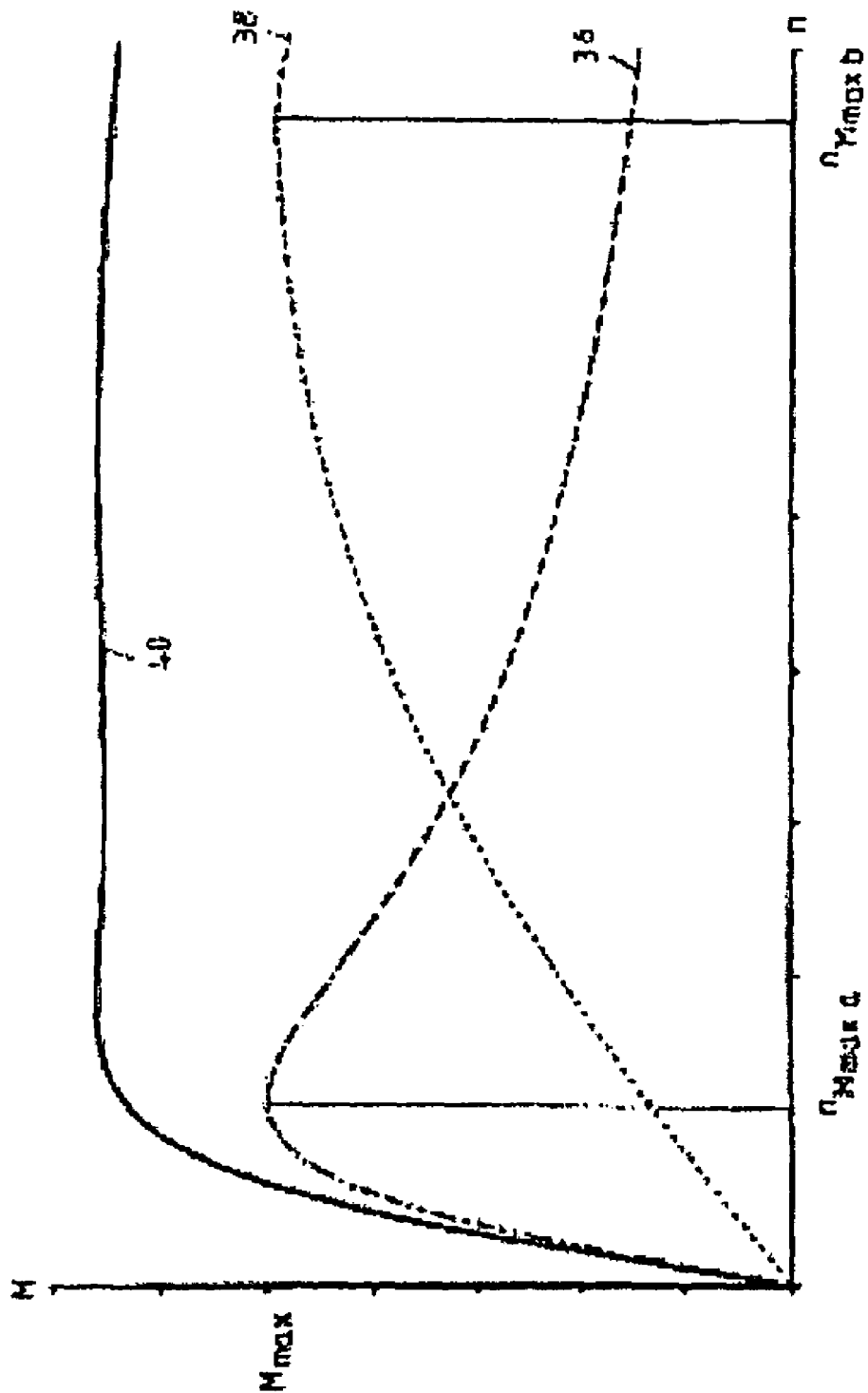
FIG. 3 shows braking characteristic curves of the traction drive of the bogie in FIG. 2.

If the braking resistors 28a, 28b are connected simultaneously to the corresponding permanently excited synchronous motors 6a, 6b by the changeover switches 30a, 30b, a resulting braking characteristic curve 40 is obtained for the bogie 34 by superimposing the braking characteristic curves 36 and 38; this resulting braking characteristic curve 40 has an approximately constant profile over a large rotational speed range starting at low rotational speeds n just above zero, as is apparent from FIG. 3. Alternatively, by superimposing suitable braking characteristic curves, i.e., by means of correspondingly adapted load circuits, it would also be possible to obtain a braking torque profile which, when plotted against the rotational speed n, increases, decreases or is predefined in any desired way.

In addition to resistors 28 or instead of them, it is also possible for a load circuit 32 to contain other passive electronic components such as capacitors and/or inductors, for example, in the form of choking coils. If a resistor 28 and a capacitor are connected in parallel, for example, the maximum braking torque $M_{max}$ is increased. In contrast, by means of an inductor, which is connected in series with the resistor 28, it is possible to reduce the maximum braking torque $M_{max}$ of the assigned, permanently excited synchronous motor 6. Generally, a large number of load circuits 32 are conceivable, either by varying the resistance values, capacitance values or inductance values and/or by varying the connection of the individual components (parallel or serial), the combination of which brings about desired properties of the superimposed braking characteristic curve 40, such as, for example an approximately constant braking torque profile when plotted against the rotational speed n.

The invention is not restricted to traction drives of vehicles which are fed by an alternating current circuit; rather, the invention can also be applied in traction drives of vehicles having permanently excited synchronous motors, which are fed by a direct current power system, such as that described, for example, in DE 101 60 612.

The invention claimed is:

1. A traction drive configured to drive and to perform regenerative braking of a rail vehicle or a combination of rail vehicles, the traction drive comprising:
    a permanently excited synchronous motor and a traction current converter each assigned to at least two axles of the rail vehicle or of the combination of rail vehicles, wherein the traction current converter has at least one machine-side pulse current converter, and
    a changeover switch that is connected to the permanently excited synchronous motor that is connected at its terminals in such a way that the permanently excited synchronous motor is selectively connected to a load circuit containing at least one load element to drive the pulse current converter or to perform regenerative braking,
    wherein the load circuits which are connected to the permanently excited synchronous motors to perform regenerative braking are configured in such a way that the brake characteristic curves of the permanently excited synchronous motors are different in terms of characteristic features.

2. The traction drive of claim 1, wherein the permanently excited synchronous motors which are identical but are provided with different load circuits are combined with one another in such a way that a braking torque profile produced by superimposing the braking characteristic curves increases or decreases when plotted against the rotational speed n.

3. The traction drive of claim 1, wherein the at least two axles are assigned to a bogie, a rail vehicle component, an individual vehicle or a combination of rail vehicles.

4. The traction drive of claim 1, wherein the load circuits of the permanently excited synchronous motors differ in having load elements which are different from one another and/or in having different connections of their load elements.

5. The traction drive of claim 4, wherein the load circuits contain resistors and/or capacitors and/or inductors.

6. The traction drive of claim 5, wherein the permanently excited synchronous motors include a first and second permanently excited synchronous motor and wherein the load circuits have different braking resistors such that the maximum braking torque $M_{max}$ of the braking characteristic curve of a first permanently excited synchronous motor assigned to the one axle occurs at a lower rotational speed n than the maximum braking torque $M_{max}$ of the braking characteristic curve of the second permanently excited synchronous motor which is assigned to the other axle.

7. The traction drive of claim 1, wherein one of the differing characteristic features is the position of the maximum braking torque $M_{max}$ as a function of the rotational speed n.

* * * * *